A. FOPPIANO.
MACHINE FOR CUTTING HOLES IN GLASS, MARBLE, AND LIKE MATERIAL.
APPLICATION FILED SEPT. 7, 1910.
1,048,059.
Patented Dec. 24, 1912.
2 SHEETS—SHEET 1.
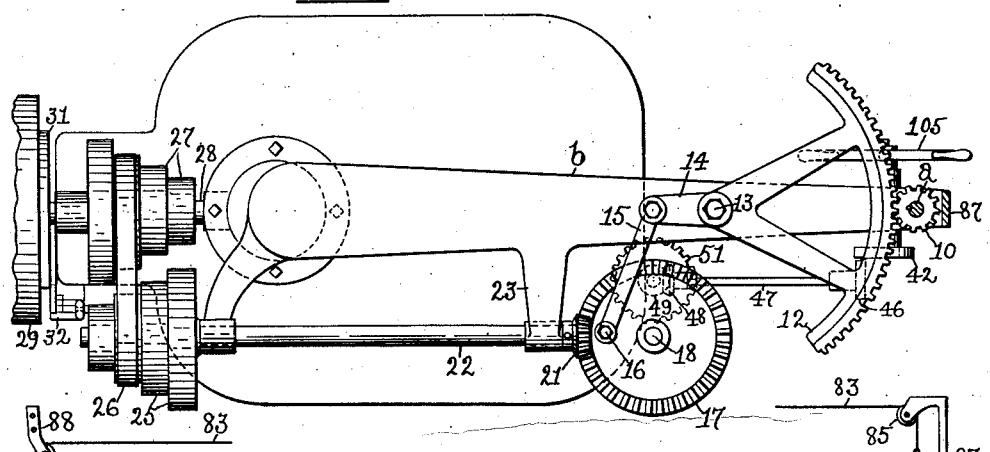
Fig. 1.
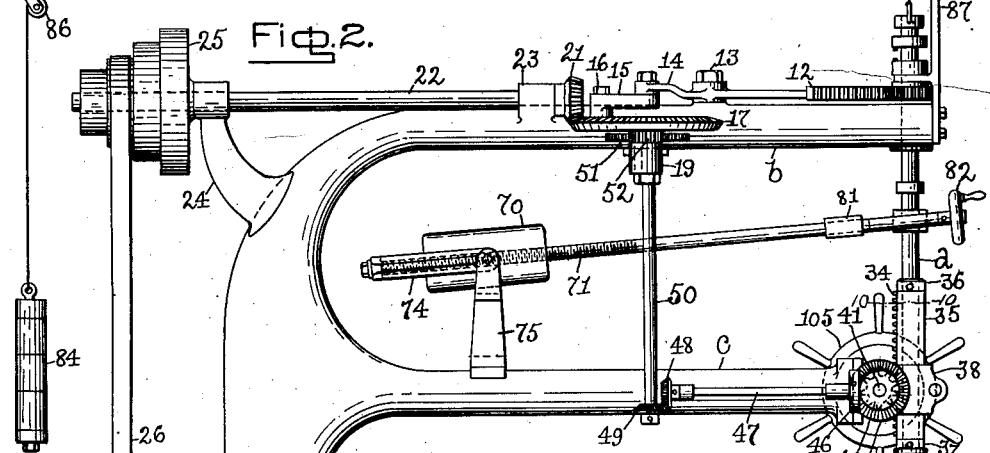
Fig. 2.
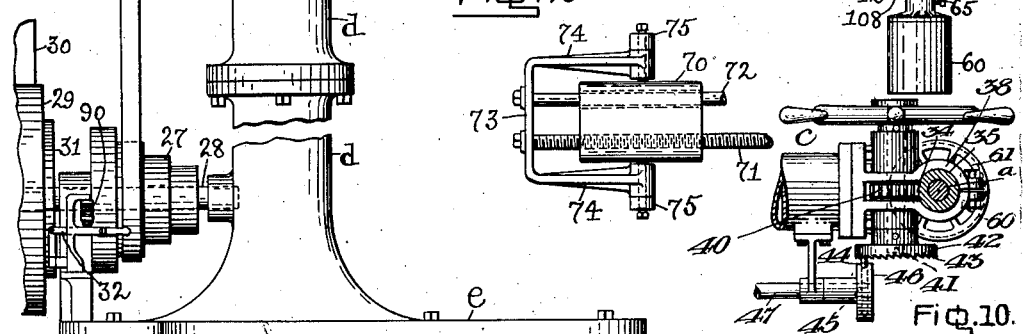
Fig. 2ª.  Fig. 10.
Witnesses:
M. G. Crozier
J. Murphy
Inventor,
Antonio Foppiano
by Jas. H. Churchill
Atty.

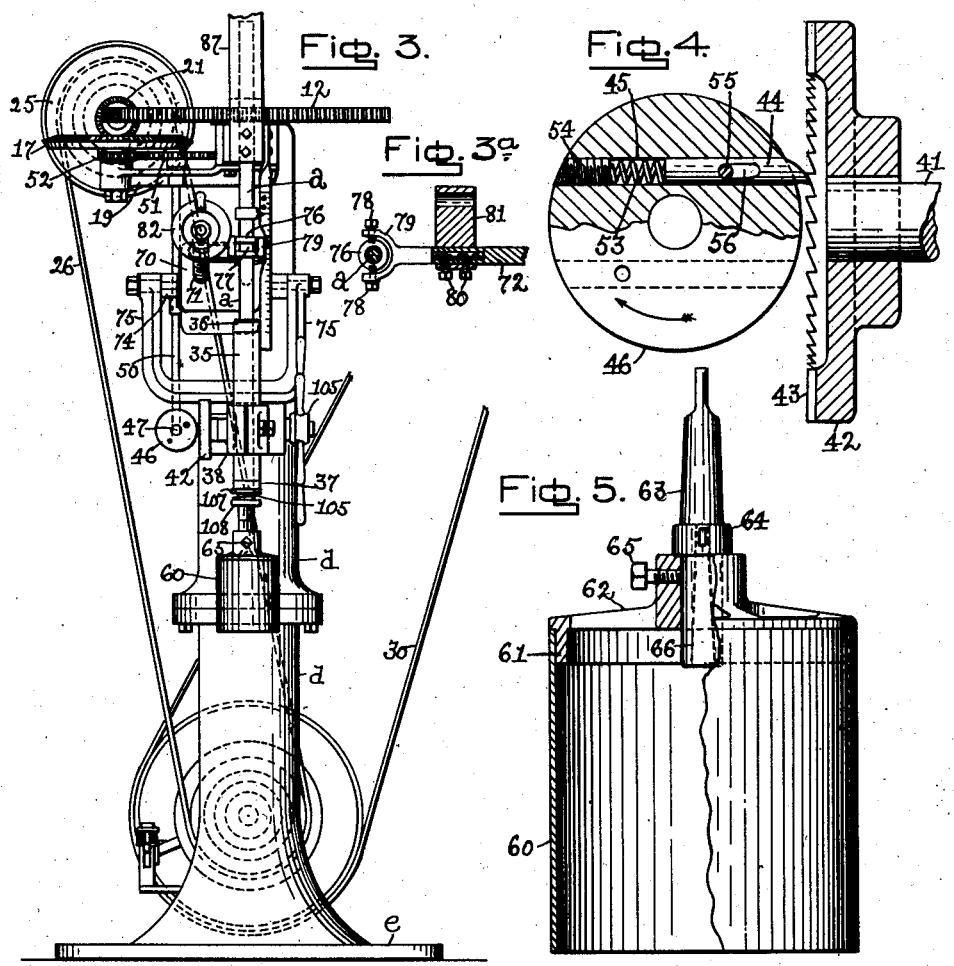
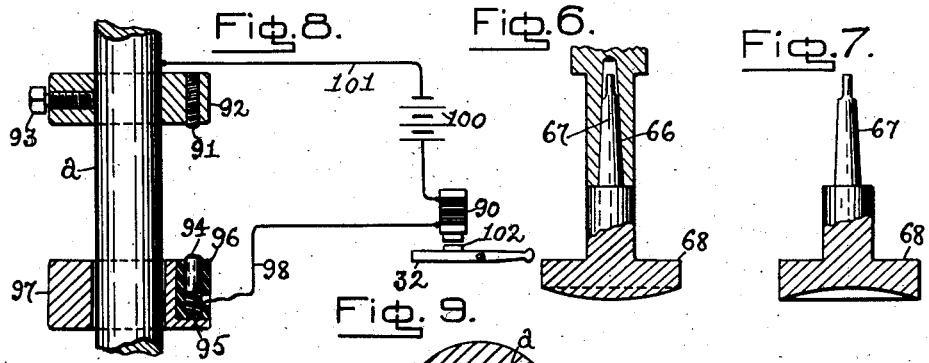

UNITED STATES PATENT OFFICE.

ANTONIO FOPPIANO, OF BOSTON, MASSACHUSETTS.

MACHINE FOR CUTTING HOLES IN GLASS, MARBLE, AND LIKE MATERIAL.

1,048,059.　　　　　Specification of Letters Patent.　　Patented Dec. 24, 1912.

Application filed September 7, 1910. Serial No. 580,912.

*To all whom it may concern:*

Be it known that I, ANTONIO FOPPIANO, a subject of the King of Italy, but now residing in Boston, county of Suffolk, and State of Massachusetts, have invented an Improvement in Machines for Cutting Holes in Glass, Marble, and Like Material, of which the following description, in connection with the accompanying drawings, is a specification, like letters on the drawings representing like parts.

This invention relates to a machine especially designed and adapted among other uses to be employed for cutting circular holes in pieces of glass, stone, marble, iron or other material. For this purpose, the machine is provided with a tool secured to the end of a vertical spindle or shaft, which has imparted to it an oscillating rotary motion and a longitudinal motion, and which has coöperating with it means for varying the pressure of the work tool on the work. Provision is also made for automatically stopping the machine when the tool has been forced through the work, whereby the danger of cutting into the work support is avoided.

The invention further has for its object to provide a machine of the character described, which is simple in construction and efficient in operation.

These and other features of this invention will be pointed out in the claims at the end of this specification.

Figure 1 is a plan view with parts in section of a machine embodying this invention. Fig. 2, a side elevation of the machine shown in Fig. 1. Fig. 2ª, a detail of the adjustable weight to be referred to. Fig. 3, an end elevation of the machine. Fig. 3ª, a detail in section of the connection of the rod 72 with the spindle. Fig. 4, a detail in section of the spindle lifting mechanism. Fig. 5, a detail on an enlarged scale of the tool shown in Fig. 2. Figs. 6 and 7, modified tools to be referred to. Fig. 8, a diagrammatic view of the stopping mechanism. Fig. 9, a detail of one of the electrical connections to be referred to, and Fig. 10, a section on the line 10, Fig. 2.

Referring to the drawings, $a$ represents a vertical shaft or spindle which is mounted to oscillate and to reciprocate in a suitable framework, comprising as herein shown two arms $b$, $c$, extended laterally from an upright or standard $d$ having a base plate or flange $e$. The spindle $a$ has imparted to it an oscillating rotary motion, and for this purpose said spindle has splined or keyed to it a pinion 10, which meshes with a segmental gear 12 mounted to turn on a center pin 13 erected upon the arm $b$, said segmental gear having an arm 14, which is joined by a link 15 to a pin 16 eccentrically located on a bevel gear 17, mounted on a stud or pin 18 carried by a bracket or arm 19 extended laterally from the frame arm $b$ (see Fig. 3).

The bevel gear 17 is driven by a bevel pinion 21 on a shaft 22 having bearings in brackets or arms 23, 24, attached to the frame arm $b$, said shaft as herein shown having a stepped pulley 25, which is connected by a belt 26 to a stepped pulley 27 fast on a main or driving shaft 28, which is provided with a normally loose pulley 29, which is continuously driven by a belt 30 and is designed to be rendered fast on the shaft 28 by a clutch 31 of any suitable or desired construction, which is actuated by a lever 32.

The spindle $a$ has imparted to it a reciprocating motion, it being moved downward by gravity and upward by mechanism, which comprises a rack bar 34 forming one side of a substantially square box 35 through which the spindle is extended and which is connected with said spindle so as to move longitudinally therewith while permitting the spindle to rotate, by collars 36, 37, fast on the spindle above and below said box, which is movable in a guideway in a bracket 38 attached to the frame arm $c$.

The rack bar 34 has meshing with it a pinion 40 (see dotted lines Fig. 2) mounted on a shaft 41, having fast thereon a disk or wheel 42 having on one face ratchet teeth 43 (see Fig. 4) with which coöperates a pawl 44, which is mounted to slide in an opening 45 in the periphery of a disk 46 fast on a horizontal shaft 47, supported by the framework and provided with a bevel pinion 48, which meshes with and is driven by a bevel pinion 49 on a vertical shaft 50, having at its upper end a gear 51 (see Fig. 3) which meshes with a pinion 52 attached to the bevel gear 17.

The pawl 44 is normally held in its projected position shown in Fig. 4 by a spring 53, located in the opening 45 between the pawl and an externally threaded plug or nut 54, and is limited in its forward movement by a pin 55 carried by the disk 46 and extended through a slot 56 in the pawl.

From the above description, it will be seen that when the clutch 31 is thrown so as to couple the pulley 29 to the shaft 28, the latter will drive the shaft 22 through the pulley 27, belt 26 and pulley 25. The shaft 22 through the pinion 21 rotates the bevel gear 17, and rotation of the latter effects oscillation of the gear 12, pinion 10, and of the spindle a. At the same time, the pawl carrying disk 46 is rotated continuously in one direction by the pinion 52, gear 51, shaft 50, pinions 49, 48, and shaft 47. The shaft 22 therefore acts as a driving shaft by which an oscillating rotary movement is imparted to the spindle a and a continuous rotary movement is imparted to the pawl carrier 46. The pawl carrier may be provided with a single pawl or if desired with a plurality of pawls. At each rotation of the pawl carrier, the ratchet wheel 42 is rotated the distance of one tooth by each pawl, and the pinion 40 is rotated so as to move the rack bar 34 upward and thereby lift the spindle a and its attached tool a sufficient distance to allow abrasive material, such as carborundum, emery, etc., to drop down under the tool, inasmuch as the abrasive material will be employed as the active agent by which the glass, stone, marble, etc., is cut or ground. In Fig. 2, the spindle has secured to it a tool with which it is designed to cut circular holes in the work, which may be glass, stone or other material.

The tool referred to may be made as shown in Fig. 5 and consists of a metal cylinder 60 having a square or blunt lower edge and having its upper end forced onto an annular flange 61 on a spider or head 62, which is fitted over the lower end of a tool carrying shank or rod 63 and bears against a collar 64 thereon, and is secured by the set screw 65. The lower end of the tool carrier may and preferably will be provided with a tapered socket 66 (see Fig. 6) for the reception of the tapered shank 67 of tools of other forms, as for instance a solid tool having a head 68, which is convexed as shown in Fig. 6 or concaved as shown in Fig. 7, these latter tools being used for grinding concavities or convexities in glass, stone, marble, etc. The upper end of the tool carrier 63 may and preferably will be made tapering to fit a tapered socket in the lower end of the spindle a. Provision is also made for regulating or adjusting the pressure of the tool on the work and for varying or adjusting the pressure while the machine is in operation, if so desired. To this end, I employ a weight 70 having a threaded bore, which is engaged by a screw-threaded shaft or rod 71 and is mounted to slide on a guide rod 72, which latter is fastened at one end to a yoke comprising a cross bar 73 and side arms 74, which are pivoted to upright arms 75 secured to the frame arm c. The guide rod 72 is pivotally connected at its opposite end with the spindle a, and for this purpose, said spindle has fast on it a collar 76 (see Figs. 3 and 3ª) having an annular groove 77, into which projects pins or screws 78 carried by the fork arms 79 of a detachable section of the guide rod, said section having a reduced end portion which fits into a socket in the end of the guide rod (see Fig. 3ª) and is fastened therein by set screws 80, which also secure a bearing block 81 to the guide rod, said block serving to support the outer or free end of the screw rod 71, which is provided as shown with a hand wheel 82.

The spindle a may and preferably will have connected with it by a cord 83, a weight 84 to counterbalance the weight of the spindle and its attached parts, said cord passing over pulleys 85, 86, the pulley 85 being supported by a bracket or arm 87 attached to the frame arm b, and the pulley 86 being carried by a hanger 88, which in practice is secured to any suitable support above the machine.

By means of the hand wheel 82 the screw rod 71 may be turned so as to cause the weight 70 to be moved toward or from the spindle and thereby toward or from the fulcrum of the supporting lever for said weight, the guide rod 72 and the yoke 73, 74, to which it is secured constituting one form of supporting lever for the weight.

It will thus be seen, that the operating tool can be made to bear down on the work with any desired pressure within limits, and that this pressure can be varied, if desired, while the machine is in operation. Provision is also made for stopping the oscillation of the spindle when the tool has penetrated the work, so as to avoid damaging the work support or the tool or both, and for this purpose, the spindle a has adjustably secured to it the movable member of a circuit controller, which governs an electro-magnet 90, which is associated with the clutch 31 in a manner well understood so as to throw out the clutch when the magnet 90 is energized.

The movable member of the circuit controller is shown in Fig. 8 as a threaded pin 91 carried by a metal collar 92 secured to the spindle by the set screw 93 so as to be adjustable thereon. The threaded pin 91 is adjustable in a threaded opening through the collar 92 and projects slightly below said collar, so as to engage the cooperating member of the circuit controller, which may be designated the stationary member, inasmuch as it is carried by the frame of the machine, although said member is in itself movable to a limited extent.

The stationary member is shown as a metal plug or button 94, which rests on a spring 95 in a socket in a bushing 96 of insulating material, which is inserted in a hole or socket drilled in a collar 97, so as to cut the circumference of the same and afford convenient means for connecting one wire 98 of the circuit of the electromagnet 90 with the button 94. The collar 97 is fixed to the frame and the spindle *a* passes freely through it. As shown in Fig. 2, the collar 97 is fixed to the upright arm or bracket 87.

The collar 92 on the spindle *a* is adjustable thereon, so as to properly position the movable member 91 from the stationary member 94 of the circuit controller according to the thickness of the work, as it is desired that the circuit of the electromagnet 90 should be closed as soon as the tool has penetrated the work.

By reference to Fig. 8, it will be seen that the electromagnet 90 is included in circuit with a battery 100 or other source of current, which is connected by the wire 101 with the spindle *a* or with the frame of the machine and thereby with the movable member 91, while the stationary member 94 is insulated from the frame and is connected by the wire 98 with the electromagnet 90. It will, therefore, be seen, that when the spindle *a* descends to the point where the member 91 engages the member 94, the circuit of the magnet 90 is closed and the latter energized, so as to attract its armature 102 and thereby operate the clutch 31 so as to throw it into its inoperative position and thus stop the machine.

The spindle *a* may be elevated by hand to withdraw it from the work by a hand wheel 105 on the shaft 41, and the spindle may be cushioned on its upward movement by a spring 106 interposed between collars 107, 108, on the spindle, the collar 108 being fast on the spindle and the collar 107 being loose thereon and engaging the nut 37.

The operation of the machine may be briefly described as follows:—When the machine is not in operation, the spindle *a* is in its elevated position and is held therein by the counterbalance 84. The operator places the work, such as a piece of glass, marble, etc., below the spindle *a* upon a suitable support, not shown. The spindle may then be lowered so that its tool 60 contacts with the work, by turning the hand wheel 105, and when the tool 60 is engaged with the work, the clutch lever 32 may be operated by hand to couple the shaft 28 with the driving pulley 29 and thus start the spindle in its oscillating movement. The tool 60 acts in conjunction with the carborundum, emery or like abrasive material, to cut into the work, said abrasive material being usually placed upon the work in a moistened or wet condition. The tool is pressed down on the work by the weight 70, which under the influence of gravity acts to feed the tool as it progresses through the work, and which is moved toward the spindle more or less by the operator turning the hand wheel 82, the nearer to the spindle the weight 70 is brought, the greater the pressure of the tool on the work. As the work is cut into by the tool and the abrasive material, it is raised a slight distance at each rotation of the shaft 47, as above described which allows opportunity for fresh abrasive material to descend under the tool 60.

When the work has been finished, the circuit of the electromagnet 90 is closed and the clutch automatically thrown into its inoperative position, and rotation of the spindle stopped, after which the hand wheel 105 is turned to raise the spindle into its elevated or inoperative position, in which it is held by the counterbalance.

The spindle *a* may have secured to it an index collar 150 which registers with a stationary scale 151 by means of which the progress of the tool through the work may be noted.

While I may prefer to employ the weight 84 to counterbalance the weight of the tool and its spindle, and thereby enable the latter to be quickly and easily raised by the operator with a minimum labor, and also to enable the tool to be maintained in its elevated position when the machine is not in use, I do not desire to limit the invention in this respect, as the counterweight 84 may be omitted without affecting the operation of the tool or of the weight 70.

I claim—

1. In an apparatus of the character described, in combination, a vertically movable tool-holding shaft or spindle, means for imparting an oscillating movement to said spindle as it is moved downward, means for periodically lifting said spindle a predetermined distance at different points in its downward movement, means coöperating with said spindle for varying the pressure of the tool carried thereby upon the work, and manually operated mechanism for operating said means at the will of the operator and while the machine is in operation, substantially as described.

2. In an apparatus of the character described, in combination, a vertically movable tool-holding shaft or spindle, means for oscillating said spindle, means for moving said spindle downward into engagement with the work and for varying the pressure of the tool carried by said spindle on the work, at the will of the operator, and manually operated mechanism for moving said means, substantially as described.

3. In an apparatus of the character described, in combination, a vertically movable tool-holding shaft or spindle, means for oscillating said spindle, means for moving said spindle downward into engagement with the work and for varying the pressure of the tool carried by said spindle on the work, at the will of the operator, manually operated mechanism for moving said means, and independent means for manually elevating said spindle, substantially as described.

4. In an apparatus of the character described, in combination, a vertically movable tool-holding spindle, a lever connected with said spindle, a screw rod connected with said lever to move therewith, a weight in threaded engagement with said screw rod and movable longitudinally thereon to vary the pressure of the tool carried by said spindle on the work, and means to oscillate said spindle, substantially as described.

5. In an apparatus of the character described, in combination, a vertically movable tool-holding spindle, a weight operatively connected with said spindle and movable toward and from the same to vary the pressure of the tool carried by said spindle on the work, manually operated means for moving said weight at the will of the operator, and means to oscillate said spindle.

6. In an apparatus of the character described, in combination, a vertically movable tool-holding shaft or spindle, means to vary the pressure of the tool carried by said spindle upon the work, means to oscillate said spindle, and means to automatically arrest oscillation of the spindle when the latter has been moved downward a predetermined distance.

7. In an apparatus of the character described, in combination, a vertically movable tool-holding spindle, means to oscillate it, and means movable toward and from the spindle at the will of the operator while the machine is in operation, to vary the pressure of the tool carried by said spindle on the work and manually operated mechanism to move said means, substantially as described.

8. In an apparatus of the character described, in combination, a vertically movable tool-holding spindle, means for normally holding it in its elevated position, means for imparting a variable downward pressure of the spindle upon the work while the machine is in operation, manually operated mechanism to move said means and means for imparting an oscillating movement to said spindle while it is moving downward.

9. In an apparatus of the character described, in combination, a vertically movable tool-holding spindle, means for normally holding it in its elevated position, means for imparting a downward pressure of the spindle upon the work, while the machine is in operation, mechanism for varying said pressure, means for imparting an oscillating rotary movement to said spindle while it is moving downward through the work, and means for intermittently elevating said spindle a less distance than its complete downward movement and while the spindle is progressing on its downward movement through the work.

10. In an apparatus of the character described, in combination, a vertically movable tool-holding spindle, means to counterbalance it and normally hold it in its elevated position, means for varying the downward pressure of the tool carried by said spindle on the work, while the machine is in operation, mechanism for moving said means and means for imparting an oscillating movement to said spindle as it is moved downward, substantially as described.

In testimony whereof, I have signed my name to this specification in the presence of two subscribing witnesses.

ANTONIO FOPPIANO.

Witnesses:
   Jas. H. Churchill,
   J. Murphy.